United States Patent Office 3,717,628
Patented Feb. 20, 1973

3,717,628
METHOD FOR THE PREPARATION OF
2,3-DIMETHYL AZIRIDINE
Charles A. Rowe, Jr., Westfield, and Eugene L. Stogryn,
Fords, N.J., assignors to the United States of America
as represented by the Secretary of the Air Force
No Drawing. Filed Oct. 9, 1970, Ser. No. 79,622
Int. Cl. C07d 23/02
U.S. Cl. 260—239 E          1 Claim

ABSTRACT OF THE DISCLOSURE

This invention involves the synthesis of 2,3-dimethyl aziridine in both its cis and trans isomeric forms. Synthesis is effected by treating the appropriate isomeric form of 2-butene. Treatment is carried out by a four step process resulting in the formation of the corresponding cis-2,3-dimethyl aziridine compound or the trans-2,3-dimethyl aziridine compound. In the first step of the process, 2-butene is epoxidized with peracetic acid. The resulting epoxide is then converted to an amino alcohol by treatment with ammonia. In the third step, an inner salt is formed by reacting the amino alcohol with chlorosulfonic acid. Finally, the inner salt is treated with sodium hydroxide to produce the aziridine compound of this invention.

BACKGROUND OF THE INVENTION

This invention relates to a method for preparing 2,3-dimethyl aziridine. More specifically, this invention concerns itself with a four step process for preparing both the cis and trans isomeric forms of 2,3-dimethyl aziridine.

A variety of methods exist for the preparation of substituted aziridine compounds. For example, the treatment of alkylol amine sulfuric acid esters with inorganic bases, in either an aqueous or alcoholic solution is well known. Also, the treatment of aminoalkyl sulfates with alkali metal hydroxides, as well as the treatment of amino alkanols with sulfuric acid, have been relied upon in the past for producing aziridine compounds. However, these prior art processes have been found inferior because of poor yields, high reaction temperatures, lengthy reaction times and the necessity for using economically prohibitive reagents.

In attempting to overcome the problems and disadvantages associated with these previous known methods, it has been found that isomerically pure 2,3-dimethyl aziridine can be effectively and efficiently synthesized by converting the cis isomeric and trans isomeric forms of 2-butene into the corresponding isomeric form of 2,3-dimethyl aziridine. The conversion of 2-butene is accomplished by first epoxidizing 2-butene and then successively treating the resulting epoxide with ammonia, chlorosulfonic acid and sodium hydroxide in a four step process. The individual process steps which encompass the invention are known. The combination of steps however, together with the particular sequence of steps and the particular reagents utilized in those steps, provides a novel process for synthesizing the substituted aziridines of this invention.

SUMMARY OF THE INVENTION

In accordance with the broad concept of this invention, 2,3-dimethyl aziridine can be synthesized by a four step process comprising the successive treatment of either cis- or trans-2-butene with peracetic acid, ammonia, chlorosulfonic acid and sodium hydroxide to produce the corresponding aziridine. This process provides a simple, economical and efficient means for synthesizing the substituted aziridines of this invention. The resulting products possess significant reactivity and find utility as precursors in a variety of organic syntheses. Also, they find use in a number of textile applications as an agent for improving the elasticity and resiliency of textile fabrics.

Accordingly, the primary object of this invention is to provide a method for synthesizing 2,3-dimethyl aziridine.

Another object of this invention is to provide a method for converting 2-butene to a substituted aziridine compound.

Still another object of this invention is to provide an efficient and economical process for preparing 2,3-dimethyl aziridine in high yield without resorting to the high reaction temperatures and lengthy reaction times relied upon heretofore.

The above and still other objects and advantages of this invention will become readily apparent upon consideration of the following detailed description thereof.

DESCRIPTION OF PREFERRED EMBODIMENT

The present invention encompasses a process for preparing isomerically pure cis-2,3-dimethyl aziridine and trans-2,3-dimethyl aziridine by converting cis or trans-2-butene into the corresponding aziridine by a novel four step process. The conversion of 2-butene compound according to the process of this invention can be exemplified best by referring to the following four equations which illustrate the four step process.

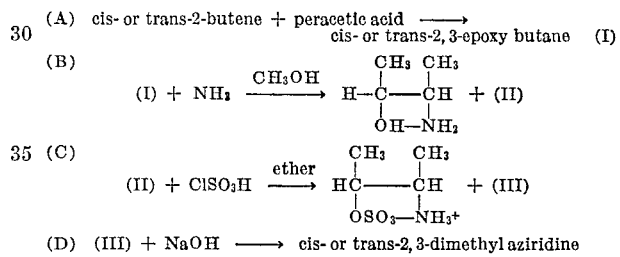

(D)  (III) + NaOH ⟶ cis- or trans-2,3-dimethyl aziridine

By way of further explanation, Equation A describes the initial step of the reaction. From cis-2-butene and trans-2-butene, 60–70 percent yields of the corresponding epoxide are obtained by dripping an excess of commercial peracetic acid (40 percent peracetic-acid in acetic acid) into a stirred dioxane solution of cis- or trans-2-butene. The reaction temperature is maintained at 0–10° C. during addition of the peracetic acid solution. The time required for addition is generally 6–8 hours.

In a typical run 435 g. of cis-2-butene is condensed into 500 ml. of dioxane, cooled to 0° C. and reacted with peracetic acid. Epoxidation of this quantity of olefin is best effected with 1620 g. of commercial 40 percent peracetic acid. The 40 percent commercial peracetic acid is treated prior to addition by enough sodium acetate to neutralize the sulfuric acid present. The organic phase is separated from the aqueous phase and dried with a suitable drying agent such as potassium carbonate. The epoxide is recovered by suitable distillation techniques, B.P. 57–59° C.

This process need not be restricted to the use of peracetic acid for the purpose of effecting epoxidation of the butenes. Other peracids such as perbenzoic, pertrifluoroacetic, metachloroperbenzoic can also be employed. Solvents other than dioxane also are suitable for the epoxidation reaction. The only two requirements that must be fulfilled by the solvent are that it be inert towards oxidation and acids and, secondly, have a boiling point at least 10° C. above or below that of the butylene oxide.

The amino alcohol is prepared, according to Equation B in 70–80 percent yields by reacting the purified epoxide from the first step with condensed ammonia in methanol.

Alcohols other than methanol are also suitable reaction solvents.

In a typical run, 275 g. of epoxide, 650 g. of ammonia, and 550 cc. of methanol are charged to a suitable pressure vessel and heated to 80° C. for 72 hours. At the end of the reaction time the contents are fractionally distilled and amino alcohol is collected. From cis-2-butylene oxide, threo-3-amino-2-butanol, B.P. 66° C. 14, $n_D^{20}$ 1.4468, is collected and from trans-2-butylene oxide, erythro-3-amino-2-butanol, B.P. 58–60° C. 10.

Listed in Table I for comparative purposes are results of some amino alcohol syntheses by the ammonia-methanol, ammonia water, and ammonia-ammonium chloride technique. Alcohols are advantageous over water because of increased yields and a greater facility for solvent removal.

TABLE I.—AMINO ALCOHOL SYNTHESIS
Epoxide+NH₃+CH₃OH

| Grams of starting material | | | Reaction conditions | | |
|---|---|---|---|---|---|
| Epoxide | NH₃ | CH₃OH (cc.) | Hours | Temp., °C. | Percent yield |
| Cis-14.4 | 13.6 | 250 | 72 | 25 | 17 |
| Cis-14.4 | 68.0 | 80 | 144 | 25 | 5 |
| Cis-14.4 | 34.0 | 80 | 72 | 50 | 42 |
| Cis-19.2 | 46.0 | 100 | 192 | 50 | 42 |
| Cis-222 | 510 | 365 | 120 | 50 | 42 |
| Cis-222 | 510 | 365 | 120 | 50 | 32 |
| Cis-275 | 650 | 550 | 120 | 80 | 70 |
| Trans-20 | 60 | 25.0 | 120 | 80 | 53 |

Epoxide+NH₃+H₂O

| | | | | | |
|---|---|---|---|---|---|
| 144 | | 2,290 g. conc. NH₃ | 504 | 25 | 25 |
| 72 | | 2,290 g. conc. NH₃ | 672 | 25 | 67 |
| 9.6 | | 80 g. conc. NH3 | 72 | 50 | 33 |

Epoxide+NH₃+NH₄Cl

| | | | | | |
|---|---|---|---|---|---|
| 14.4 | 68 | 5 g. NH₄Cl | 144 | 25 | 1.0 |

In the third step, the inner salt (III) of Equation C is prepared by slowly adding a 20–50 percent ether solution of chlorosulfonic acid to an ether solution of an equimolar amount of the amino alcohol at −10° C. to +10° C. The reaction mixture is stirred for several hours. The ether is removed from the salt by filtration or flash evaporation. In this manner yields of greater than 90 percent are realized.

In the fourth step as illustrated by Equation D, the inner salt (III) from Equation C is converted to the dimethyl aziridine by adding an aqueous solution of the inner salt (III) to a stirred 50 percent solution of sodium hydroxide heated to 80° C. The aziridine is recovered as formed by flashing it from the caustic solution through a distillation column. A final fractional distillation yielded cis-2,3-dimethyl aziridine, B.P. 84° C., $n_D^{25}$ 1.4201 from threo-3-amino-2-butanol, and trans-2,3-dimethyl aziridine, B.P. 78–80° C., $n_D^{25}$ 1.4135 from the erythro isomer in yields of 70 percent.

In Table II the yields and reaction times are listed for each of the four steps. An overall yield of 38 percent is obtained in 7 days.

TABLE II.—IMPROVED PROCESS FOR AZIRIDINE SYNTHESIS

| Preparation of— | | Time, days | Yield, percent |
|---|---|---|---|
| Step: | | | |
| 1 | Epoxide | 1 | 70 |
| 2 | Amino alcohol | 5 | 99 |
| 3 | Inner salt | 0.5 | 97 |
| 4 | Aziridine | 0.5 | 70 |
| | | [1] 7 | [2] 38 |

[1] Total days. [2] Overall yield.

While the invention has been described with particularity in reference to a specific embodiment thereof, it is to be understood that the disclosure of the present invention is for the purpose of illustration only and it is not intended to limit the invention in any way, the scope of which is defined by the appended claims.

What is claimed is:

1. A process for the production of 2,3-dimethyl aziridine which comprises the steps of (a) adding peracetic acid continuously for a period of from about 6 to 8 hours to a solvent solution of 2-butene maintained at a temperature within the range of about 0° C. to 10° C. and isolating the formed epoxide, (b) reacting said formed epoxide at a temperature of about 80° C. for a period of about 72 hours with an alcoholic solution of ammonia and isolating the formed amino alcohol, (c) adding a solution of chlorosulfonic acid to said formed amino alcohol with continued stirring for several hours while maintaining said amino alcohol at a temperature within the range of about −10° C. to +10° C. and isolating the formed inner salt, and (d) adding the said formed inner salt to a stirred solution of sodium hydroxide heated to a temperature of about 80° C. and isolating the formed 2,3-dimethyl aziridine compound therefrom.

References Cited

UNITED STATES PATENTS 3,169,143   2/1965   Gaulin et al. _____ 260—239
3,390,167   6/1968   Bender et al. _____ 260—239

OTHER REFERENCES

Wagner et al., "Synthetic Organic Chemistry" (New York, 1953), pp. 254–255.

Dickey et al., J. Am. Chem. Soc., vol. 74, pp. 944–951 (1952).

Dermer et al., "Ethylenimine and Other Aziridines" (Interscience, 1969), pp. 26–27.

ALTON D. ROLLINS, Primary Examiner